(12) United States Patent
Miyasako (10) Patent No.: US 8,432,454 B2
(45) Date of Patent: Apr. 30, 2013

(54) IMAGE CAPTURING APPARATUS AND CONTROL METHOD THEREOF

(75) Inventor: Kenichi Miyasako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 12/966,285

(22) Filed: Dec. 13, 2010

(65) Prior Publication Data

US 2011/0157381 A1  Jun. 30, 2011

(30) Foreign Application Priority Data

Dec. 25, 2009  (JP) ................................ 2009-296383

(51) Int. Cl.
*H04N 5/228* (2006.01)

(52) U.S. Cl.
USPC ..................................................... 348/208.5

(58) Field of Classification Search ................ 348/208.5
See application file for complete search history.

(56) References Cited

U.S. PATENT DOCUMENTS

| 5,282,044 | A | 1/1994 | Misawa et al. | |
|---|---|---|---|---|
| 2003/0035053 | A1* | 2/2003 | Kyuma et al. | 348/208.2 |
| 2009/0316010 | A1* | 12/2009 | Nomura | 348/208.6 |
| 2010/0033583 | A1* | 2/2010 | Tomita et al. | 348/208.5 |

FOREIGN PATENT DOCUMENTS

| EP | 0656725 A1 | 6/1995 |
|---|---|---|
| JP | 05-014801 A | 1/1993 |
| JP | 10-145662 A | 5/1998 |
| JP | 2803072 | 9/1998 |

OTHER PUBLICATIONS

European Search Report issued on Mar. 10, 2011, which is enclosed, that issued in the corresponding European Patent Application No. 10194443.7.
Dec. 28, 2012 Korean Office Action, a copy of which is enclosed without an English Translation, that issued in Korean Patent Application No. 10-2010-0129619.

* cited by examiner

*Primary Examiner* — James Hannett
(74) *Attorney, Agent, or Firm* — Cowan, Liebowitz & Latman, P.C.

(57) ABSTRACT

An image capturing apparatus comprises: an image sensing unit arranged to sense an object image; a vibration detection unit arranged to detect a vibration applied to the image capturing apparatus; a vector detection unit arranged to detect a motion vector from an image sensed by the image sensing unit; a first calculation unit arranged to calculate a first correction amount from a signal obtained based on an output from the vibration detection unit and a signal based on the motion vector; a second calculation unit arranged to calculate a second correction amount based on the motion vector; a first correction unit arranged to optically correct the vibration based on the first correction amount; and a second correction unit arranged to correct the vibration by changing an image read region based on the second correction amount, wherein vibration correction is performed using both the first and second correction units.

6 Claims, 5 Drawing Sheets

IMAGE CAPTURING APPARATUS AND CONTROL METHOD THEREOF

BACKGROUND OF THE INVENTION

1. Field of the Invention

The present invention relates to a technique of correcting for vibrations of an image capturing apparatus using both optical and electronic vibration correction systems in the image capturing apparatus.

2. Description of the Related Art

Recently, as image capturing apparatuses become more compact and the magnification produced by optical systems become higher, vibration of the image capturing apparatus can greatly degrade the quality of a captured image. Various vibration correction functions have been proposed, which correct the blur of a captured image, arising from vibration of the imaging apparatus. A conventional vibration correction function mounted in an image capturing apparatus is known in which the correction method uses both optical and electronic vibration correction systems (see, for example, Japanese Patent No. 2803072).

Firstly, the optical vibration correction system detects vibrations of the image capturing apparatus, and drives a vibration correction optical system to cancel the detected vibrations, thereby correcting the vibrations so that object light incident on the image sensor always enters the same position on the image sensing surface. Then, the electronic vibration correction system ascertains the displacement between images to detect the remaining vibrations that cannot be corrected for by the optical vibration correction system. The electronic vibration correction system moves the image read region to cancel the ascertained displacement between images, correcting for the remaining, low frequency, vibrations. In this way, the image capturing apparatus can improve the correction ability using both optical and electronic vibration correction systems.

However, the known correction method using both optical and electronic vibration correction systems suffers the following problems. An angular velocity sensor used to detect the amount of vibration of the image capturing apparatus can detect high frequency vibrations with high precision. However, the angular velocity detection characteristic generally becomes poor at low frequencies, of 1 Hz or less. Furthermore, the electronic vibration correction system cannot correct vibrations during the accumulation period of time. When all remaining vibrations, which cannot be corrected for by the optical vibration correction system, are subjected to correction by the electronic vibration correction system based on detection of a blur between images, the image quality deteriorates owing to vibrations during the accumulation period of time due to the generation of large amplitude low frequency vibrations.

SUMMARY OF THE INVENTION

The present invention has been made in consideration of the above situation, and improves the vibration correction ability while ameliorating vibrations during the accumulation period of time in a vibration correction method using both optical and electronic vibration correction systems.

According to a first aspect of the present invention here is provided an image capturing apparatus comprising: an image sensing unit arranged to sense an object image formed by an optical system; an vibration detection unit arranged to detect a vibration applied to the image capturing apparatus; a vector detection unit arranged to detect a motion vector from an image sensed by the image sensing unit; a first calculation unit arranged to calculate a first correction amount from a signal obtained based on an output from the vibration detection unit and a signal based on the motion vector; a second calculation unit arranged to calculate a second correction amount based on the motion vector; a first correction unit arranged to optically correct the vibration based on the first correction amount; and a second correction unit arranged to electronically correct the vibration by changing an image read region based on the second correction amount, wherein the image capturing apparatus is arranged such that vibration correction is performed using both the first correction unit and the second correction unit.

According to a second aspect of the present invention there is provided a method of controlling an image capturing apparatus including an image sensing unit arranged to sense an object image formed by an optical system, the method comprising: detecting a vibration applied to the image capturing apparatus; detecting a motion vector from an image sensed by the image sensing unit; calculating a first correction amount from a signal obtained based on an output in the detecting a vibration, and a signal based on the motion vector; calculating a second correction amount based on the motion vector; optically correcting the vibration based on the first correction amount; and correcting the vibration by changing an image read region based on the second correction amount, wherein vibration correction is performed using both the optically correcting the vibration and the correcting the vibration.

Further features of the present invention will become apparent from the following description of exemplary embodiments (with reference to the attached drawings).

BRIEF DESCRIPTION OF THE DRAWINGS

The accompanying drawings illustrate embodiments of the invention, and together with the description, serve to explain the principles of the invention.

DESCRIPTION OF THE EMBODIMENTS

Embodiments of the present invention will be described in detail in accordance with the accompanying drawings. Note that vibration correction control in either the lateral or longitudinal direction of an image will be explained. Vibration correction control in the other direction is the same, so a description thereof will not be repeated.

Figure 1:
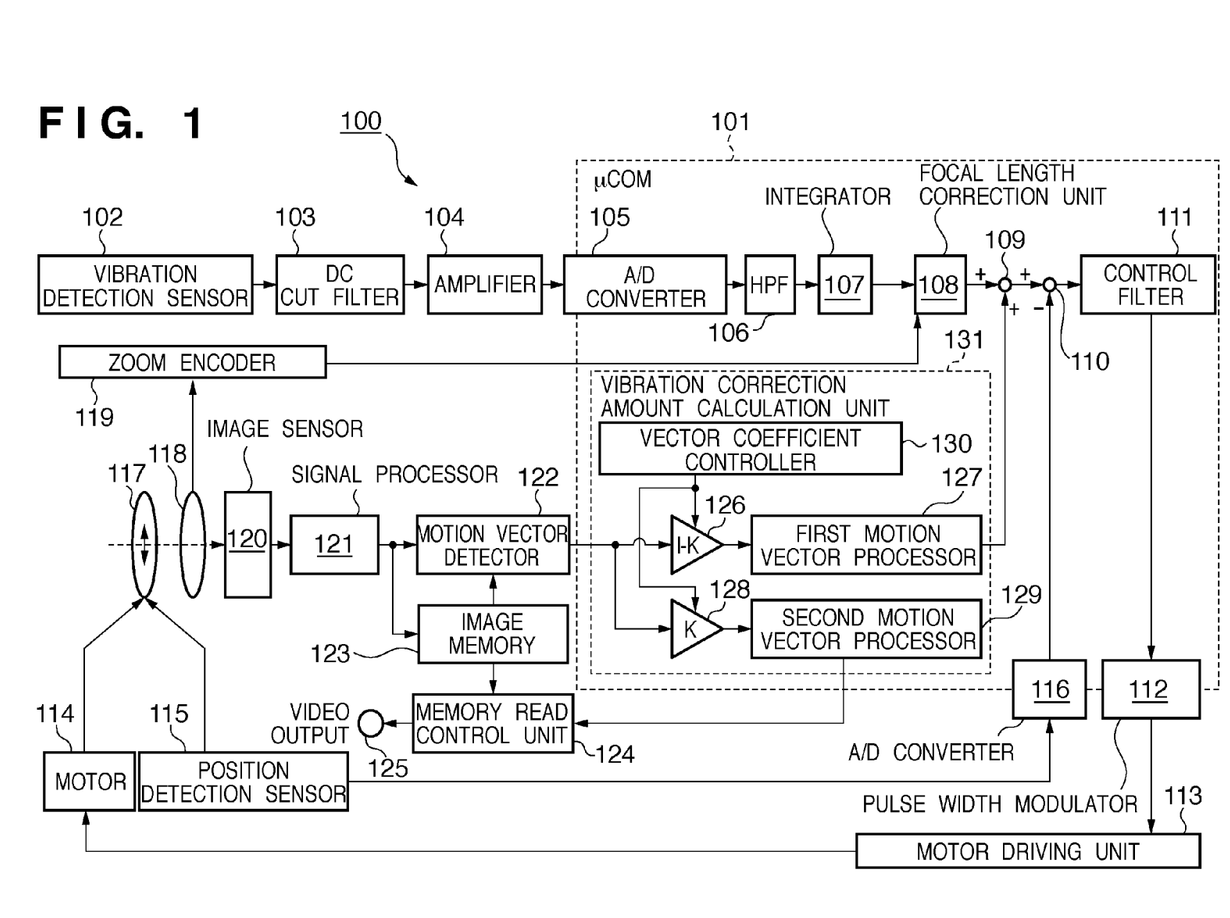
FIG. 1 is a block diagram illustrating the arrangement of an image capturing apparatus according to an embodiment of the present invention.

FIG. 1 is a block diagram showing the arrangement of an image capturing apparatus according to an embodiment of the present invention. A vibration detection sensor 102 is, for example, a vibration gyro type angular velocity sensor. The vibration detection sensor 102 detects, as a vibration signal, vibrations applied to the apparatus owing to camera shake or the swing of the body, and provides the vibration signal to a DC cut-off filter 103. The DC cut-off filter 103 cuts off a direct current (DC) component contained in the vibration signal provided from the vibration detection sensor 102, and provides only the alternating current (AC) component, that is, vibration component of the vibration signal, to an amplifier 104. Note that the DC cut-off filter 103 is, for example, a high-pass filter (HPF) which cuts off an input signal in a predetermined frequency band. The amplifier 104 amplifies, to an optimum sensitivity, the vibration signal (vibration component) provided from the DC cut-off filter 103, and provides the amplified vibration signal to an A/D converter 105. The A/D converter 105 converts the vibration signal provided from the amplifier 104 into a digital vibration signal, and provides it as angular velocity data to a high-pass filter (HPF) 106 in a micro-computer (μCOM) 101.

The HPF 106 cuts off a low frequency component contained in the digital vibration signal (angular velocity data) output from the A/D converter 105 and outputs the resultant angular velocity data. An integrator 107 integrates the angular velocity data output from the HPF 106, and outputs the integration result as angular displacement data. A focal length correction unit 108 acquires current zoom position information from a zoom encoder 119 which detects the zoom position of an imaging optical system 118 for performing zooming and focusing operations. The focal length correction unit 108 calculates the focal length from this information. The focal length correction unit 108 calculates the correction driving amount (referred to as "angular velocity optical correction data") of a correction optical system 117 based on the focal length information and the above-mentioned angular displacement data.

An image sensor 120 converts an object image formed via the correction optical system 117 and imaging optical system 118 into an image signal at a predetermined frame rate, and outputs the image signal. A signal processor 121 generates a video signal from the image signal obtained from the image sensor 120, and provides the video signal to a motion vector detector 122 and image memory 123. The motion vector detector 122 detects the motion vector of an image based on a luminance signal contained in the current video signal generated by the signal processor 121, and a luminance signal contained in the video signal of an immediately preceding field that is stored in the image memory 123.

The motion vector data detected by the motion vector detector 122 is provided to a vibration correction amount calculation unit 131 incorporated into the μCOM 101. The vibration correction amount calculation unit 131 is made up of the blocks of a first multiplier 126, first motion vector processor 127, second multiplier 128, second motion vector processor 129, and vector coefficient controller 130.

The first multiplier 126 multiplies the motion vector detected by the motion vector detector 122 by a coefficient 1−K ($0 \leq K \leq 1$), and provides the resultant data to the first motion vector processor 127. By using a low-pass filter (LPF) or the like, the first motion vector processor 127 integrates the data which has been obtained by multiplying the motion vector by the coefficient 1−K and output from the first multiplier 126. The first motion vector processor 127 sets the integration result as displacement data of the motion vector. The resultant output from the first motion vector processor 127 serves as the correction driving amount (vector optical correction data) of the correction optical system 117.

An adder 109 adds the angular velocity optical correction data from the focal length correction unit 108 and the vector optical correction data from the first motion vector processor 127, calculating the final correction driving amount (first correction amount) of the correction optical system 117. A subtractor 110 calculates the difference between the final correction driving amount from the adder 109, and a digital value (position detection data) obtained by A/D-converting, by an A/D converter 116, an output from a position detection sensor 115 which detects the position of the correction optical system 117. The subtractor 110 outputs the result to a control filter 111. A pulse width modulator 112 converts an output from the control filter 111 into a PWM (Pulse Width Modulation) signal, and outputs the PWM signal. Based on the PWM signal output from the pulse width modulator 112, a motor driving unit 113 drives a motor 114 for moving the correction optical system 117, thereby changing the optical path of light incident on the image sensing surface of the image sensor 120 and optically correcting a blur generated in the sensed image.

The second multiplier 128 of the vibration correction amount calculation unit 131 multiplies the motion vector detected by the motion vector detector 122 by a coefficient K ($0 \leq K \leq 1$), and provides the resultant data to the second motion vector processor 129. In accordance with the data obtained by multiplying the motion vector by the coefficient K, the second motion vector processor 129 calculates a control amount (second correction amount) for controlling an image read position in the image memory 123 to cancel the displacement between images. A memory read control unit 124 determines an image read position in the image memory 123 in accordance with the control amount calculated by the second motion vector processor 129. As a result, a video signal obtained by electronically correcting vibrations is output from the image memory 123, and provided to a recording apparatus or display apparatus via a video output terminal 125.

The vector coefficient controller 130 determines the coefficient K. Note that the method of determining the coefficient K will be described in detail in the first to third embodiments.

First Embodiment

The processing of determining the coefficient K by a vector coefficient controller 130 in an image capturing apparatus 100 having the above arrangement according to the first embodiment of the present invention will be explained.

Figure 2A:
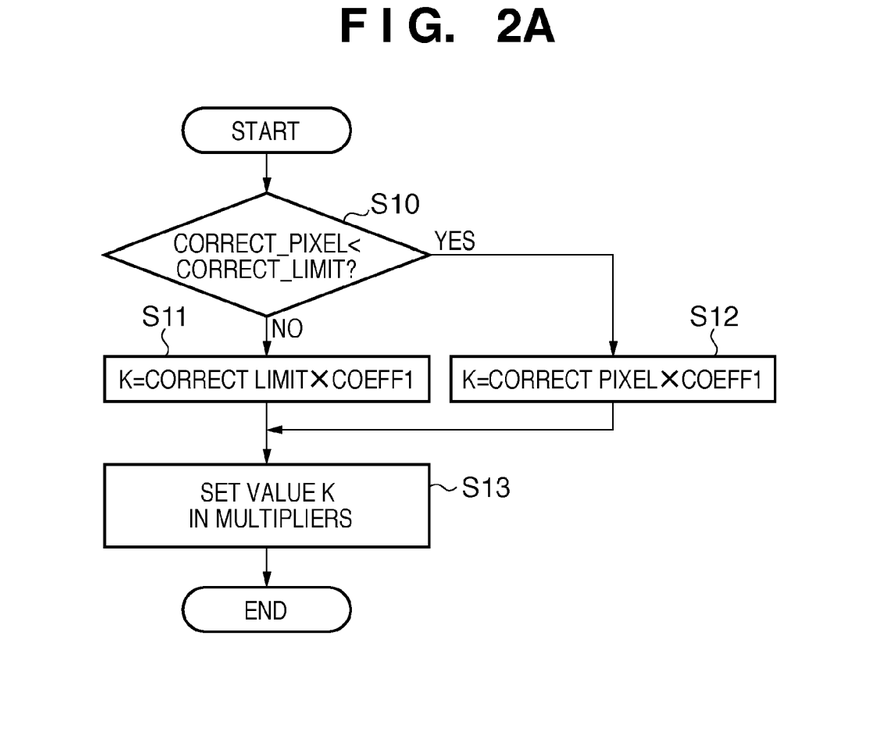
FIG. 2A is a flowchart for explaining processing by a vector coefficient controller 130 in the first embodiment.

FIG. 2A is a flowchart exemplifying processing by the vector coefficient controller 130. This processing is repeatedly performed in every predetermined period such as 1/60 sec.

In step S10, the vector coefficient controller 130 determines whether the shiftable number of pixels (CORRECT_PIXEL) for electronic vibration correction is smaller than a predetermined value CORRECT_LIMIT. In electronic vibration correction, a partial area (for example, area B in FIG. 3) is extracted from the entire image sensing area (for example, area A in FIG. 3) read out from an image sensor 120, and the position of the read area is changed within the image sensing area so as to cancel vibrations. For example, in FIG. 3, the shiftable number of pixels for electronic vibration correction (in the lateral direction of the frame in FIG. 3) corresponds to portions a and b; that is CORRECT_PIXEL=$a+b$.

Figure 3:
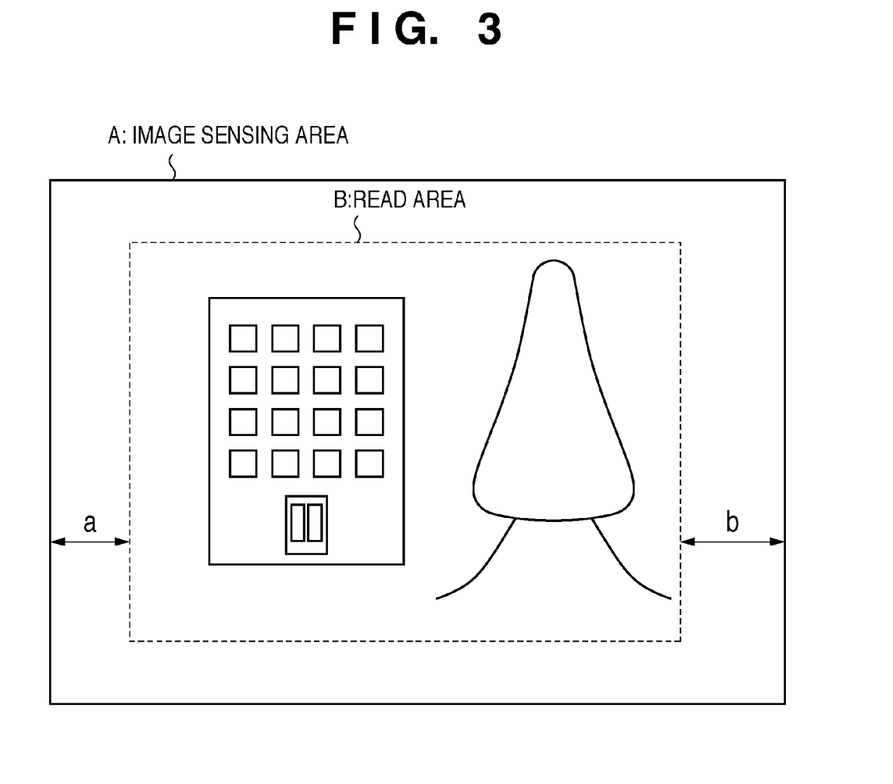
FIG. 3 is a view for explaining the shiftable number of pixels for electronic vibration correction in the first embodiment.

Changing the electronic zoom ratio of the image capturing apparatus 100 means changing the area B in FIG. 3, and the shiftable number of pixels (CORRECT_PIXEL) changes depending on the electronic zoom ratio.

If the vector coefficient controller 130 determines in step S10 that CORRECT_PIXEL is smaller than CORRECT_LIMIT, it shifts to a process in step S12. In step S12, the vector coefficient controller 130 determines, as the coefficient K, a value obtained by multiplying CORRECT_PIXEL by a predetermined coefficient COEFF1 ($0<COEFF1<1/CORRECT\_LIMIT$):

coefficient $K$=shiftable number CORRECT_PIXEL of pixels for electronic vibration correction×predetermined coefficient COEFF1

That is, the vector coefficient controller 130 determines, as the coefficient K, a value obtained by multiplying the shiftable number of pixels for electronic vibration correction by the predetermined coefficient COEFF1. In step S13, the vector coefficient controller 130 sets the coefficient K determined in step S12 in a first multiplier 126 and second multiplier 128.

If the vector coefficient controller 130 determines in step S10 that CORRECT_PIXEL is equal to or larger than CORRECT_LIMIT, it shifts to a process in step S11. In step S11, the vector coefficient controller 130 determines, as the coefficient K (value used in the first multiplier 126 and second multiplier 128), a value obtained by multiplying CORRECT_LIMIT by the predetermined coefficient COEFF1. That is, the vector coefficient controller 130 determines, as the coefficient K, a value obtained by multiplying a predetermined shiftable number of pixels for electronic vibration correction by the predetermined coefficient COEFF1. In step S13, the vector coefficient controller 130 sets the coefficient K determined in step S11 in the first multiplier 126 and second multiplier 128.

Figure 2B:
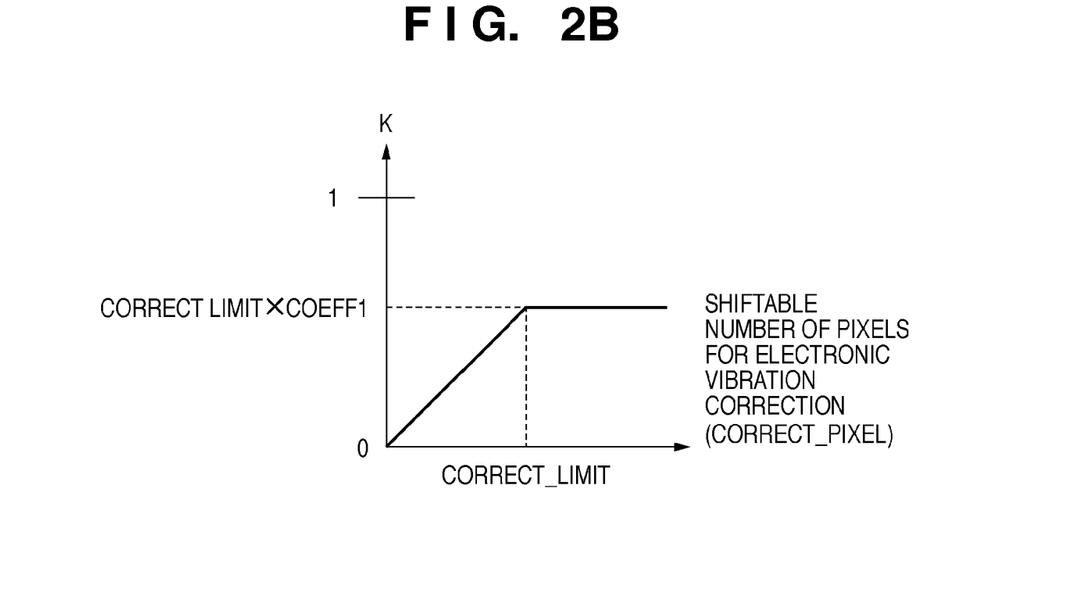
FIG. 2B is a graph illustrating a change in the value of a coefficient K in the first embodiment.

FIG. 2B is a graph exemplifying a change of the value of the coefficient K corresponding to the CORRECT_PIXEL value in steps S11 and S12. The value of the coefficient K increases as the CORRECT_PIXEL value increases, and is limited by a predetermined value CORRECT_LIMIT×COEFF1. In the graph of FIG. 2B, the coefficient K serving as a variable, and the shiftable number CORRECT_PIXEL of pixels for electronic vibration correction have a linear function relation, and COEFF1 indicates the ratio (slope) of the change. If CORRECT_PIXEL<CORRECT_LIMIT, coefficient $K$=COEFF1×shiftable number CORRECT_PIXEL of pixels for electronic vibration correction Since $0 \leq K \leq 1$, COEFF1 satisfies a relation: $0<COEFF1<1/CORRECT\_LIMIT$. This setting of the value of the coefficient K has the following advantages.

In optical vibration correction by a correction optical system 117, vibrations are corrected so that object light incident on the image sensor 120 always enters the same position on the image sensing surface. Thus, even vibrations during the accumulation period of time, which cannot be corrected by electronic vibration correction, can be corrected. In particular, vibrations during the accumulation period of time are readily generated by the high frequency component of vibrations that causes a high vibration amount per unit time. However, a vibration detection sensor 102 can detect, at high precision, the high frequency component of vibrations applied to the apparatus. Therefore, the correction optical system 117 preferably corrects the high frequency component of vibrations detected by the vibration detection sensor 102, that is, vibrations applied to the apparatus.

However, as described above, the angular velocity detection characteristic of the vibration detection sensor 102 using a vibration gyro type angular velocity sensor or the like deteriorates in a low frequency band of 1 Hz or less. In the low frequency band, the influence of a correction error becomes serious, and vibrations remain uncorrected, resulting in a poor-quality sensed image. To prevent this, a motion vector detector 122 is further adopted in addition to detection by the vibration detection sensor 102. The motion vector detector 122 detects the remaining vibrations in the low frequency band that cannot be detected by the vibration detection sensor 102. The detected vibrations are corrected, improving the correction ability.

However, if all remaining vibrations detected by the motion vector detector 122 are corrected by electronic vibration correction using a memory read control unit 124, the image quality may deteriorate owing to vibrations during the accumulation period of time upon generation of vibrations with a large amplitude in a low frequency band. Thus, in the present invention, the correction optical system 117 corrects some (1−K multiple ($0 \leq K \leq 1$)) of the remaining vibrations detected by the motion vector detector 122. This can widen the correction range and improve the vibration correction ability using both optical vibration correction and electronic vibration correction while reducing vibrations during the accumulation period of time.

The first embodiment uses both optical vibration correction and electronic vibration correction to widen the vibration correction range and improve the vibration correction ability. As the shiftable number CORRECT_PIXEL of pixels for electronic vibration correction increases, the coefficient K is increased to increase the ratio of electronic vibration correction. However, excessively increasing the ratio of electronic vibration correction makes vibrations during the accumulation period of time conspicuous. Thus, the coefficient K is limited to a predetermined value CORRECT_LIMIT×COEFF1 so that vibrations during the accumulation period of time cannot be identified by the human eye. In the above description, $0<COEFF1<1/CORRECT\_LIMIT$ is set. However, the upper limit of COEFF1 may be set depending on various requirements such as the ability of the optical vibration correction function and the dimensions of the image capturing apparatus so that vibrations during the accumulation period of time cannot be identified by the human eye. The value of the coefficient COEFF1 is set so that the coefficient K satisfies $0 \leq K \leq 1$.

As described above, the first embodiment can provide an image capturing apparatus which improves the vibration correction ability using both electronic and optical vibration correction systems while minimizing vibrations during the accumulation period of time.

Second Embodiment

Processing of determining the coefficient K by a vector coefficient controller 130 according to the second embodiment of the present invention will be explained.

Figure 4A:
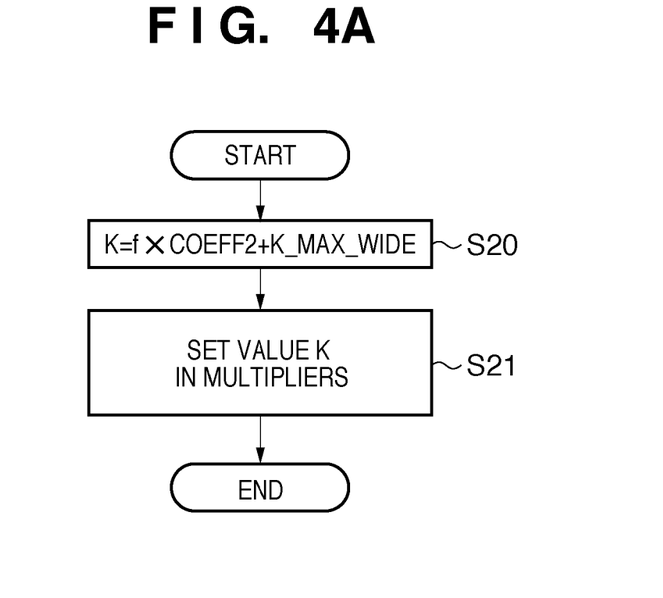
FIG. 4A is a flowchart for explaining processing by a vector coefficient controller 130 in the second embodiment.

FIG. 4A is a flowchart exemplifying processing by the vector coefficient controller 130. This processing is repetitively performed in every predetermined period such as 1/60 sec.

In step S20, the vector coefficient controller 130 determines, as the value ($0 \leq K \leq 1$) of the coefficient K, a value obtained by adding a predetermined value K_MAX_WIDE to a value obtained by multiplying the focal length f of the image capturing apparatus by a predetermined coefficient COEFF2:

coefficient $K$=focal length $f$ of image capturing apparatus×predetermined coefficient COEFF2+predetermined value $K\_MAX\_WIDE$ for $-K\_MAX\_WIDE/F\_TELE \leqq COEFF2 < 0$ $$-F\_TELE \times COEFF2 < K\_MAX\_WIDE < 1 - F\_WIDE \times COEFF2$$

where F_TELE is the focal length at the telephoto end, and F_WIDE is the focal length at the wide-angle end. The focal length f is calculated from current zoom position information obtained from a zoom encoder 119 which detects the zoom position of an imaging optical system 118. In step S21, the vector coefficient controller 130 sets the determined coefficient K in a first multiplier 126 and second multiplier 128.

Figure 4B:
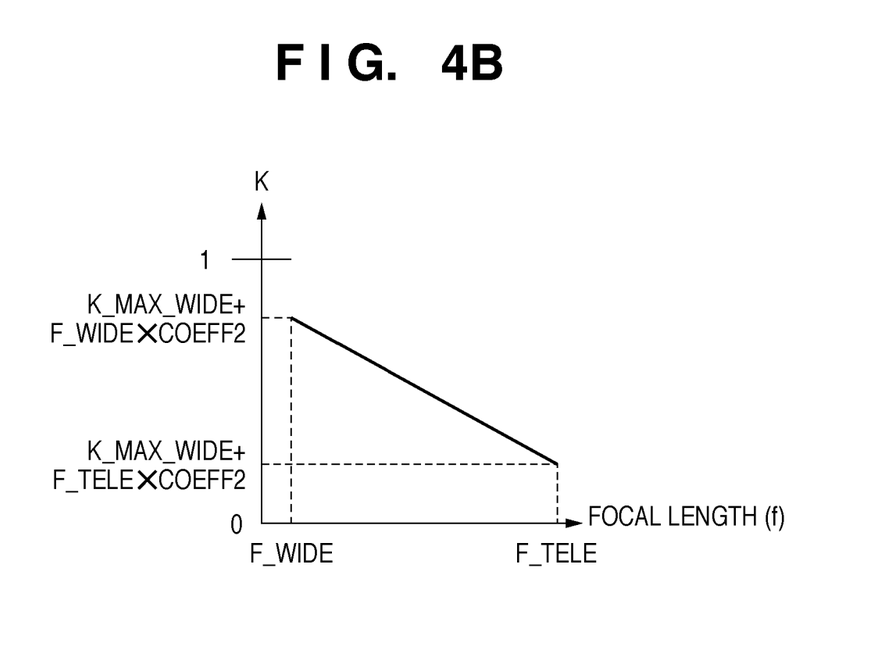
FIG. 4B is a graph exemplifying a change of the value of a coefficient K in the second embodiment.

FIG. 4B is a graph exemplifying a change of the value of the coefficient K corresponding to the value of the focal length f in step S20. The value of the coefficient K becomes a maximum value K_MAX_WIDE+F_WIDE×COEFF2 at the wide-angle end focal length F_WIDE. The value of the coefficient K decreases for a larger value of the focal length f, and becomes a minimum value K_MAX_WIDE+F_TELE×COEFF2 at the telephoto end focal length F_TELE. The setting of the value of the coefficient K has the following advantages.

Letting θ be the angle of vibrations applied to the apparatus and f be the focal length of the image capturing apparatus, the vibration amount on the image sensing surface can be approximated to be f tan θ. If the same amount of vibrations is generated, the vibration amount on the image sensing surface increases for a larger focal length f. Considering this, in the second embodiment, the coefficient K is decreased for a larger focal length f of the image capturing apparatus, reducing the ratio of electronic vibration correction. With this setting, vibrations during the accumulation period of time cannot be identified by the human eye even at a long focal length.

As described above, the second embodiment can provide an image capturing apparatus which improves the vibration correction ability using both electronic and optical vibration correction systems while minimizing vibrations during the accumulation period of time.

Third Embodiment

Processing of determining the coefficient K by a vector coefficient controller 130 according to the third embodiment of the present invention will be explained.

Figure 5A:
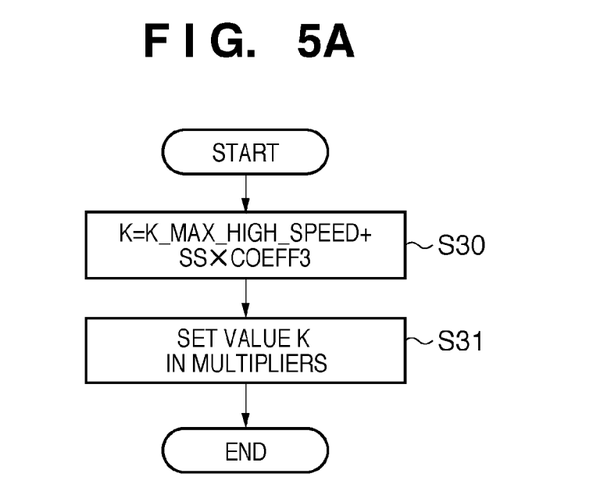
FIG. 5A is a flowchart for explaining processing by a vector coefficient controller 130 in the third embodiment.

FIG. 5A is a flowchart exemplifying processing by the vector coefficient controller 130. This processing is repetitively performed in every predetermined period such as 1/60 sec.

In step S30, the vector coefficient controller 130 determines, as the value of the coefficient K, a value obtained by adding a predetermined value K_MAX_HIGH_SPEED to a value obtained by multiplying the shutter speed SS of the image capturing apparatus by a predetermined coefficient COEFF3:

coefficient $K$=shutter speed SS×predetermined coefficient COEFF3+predetermined value $K\_MAX\_HIGH\_SPEED$ Letting SLOW_SS be the slowest shutter speed of the image capturing apparatus, relations:

$$-K\_MAX\_HIGH\_SPEED/SLOW\_SS < COEFF3 < 0$$

$$-SLOW\_SS \times COEFF3 < K\_MAX\_HIGH\_SPEED < 1 - HIGH\_SS \times COEFF3$$

hold. In step S31, the vector coefficient controller 130 sets the determined coefficient K in a first multiplier 126 and second multiplier 128.

Figure 5B:
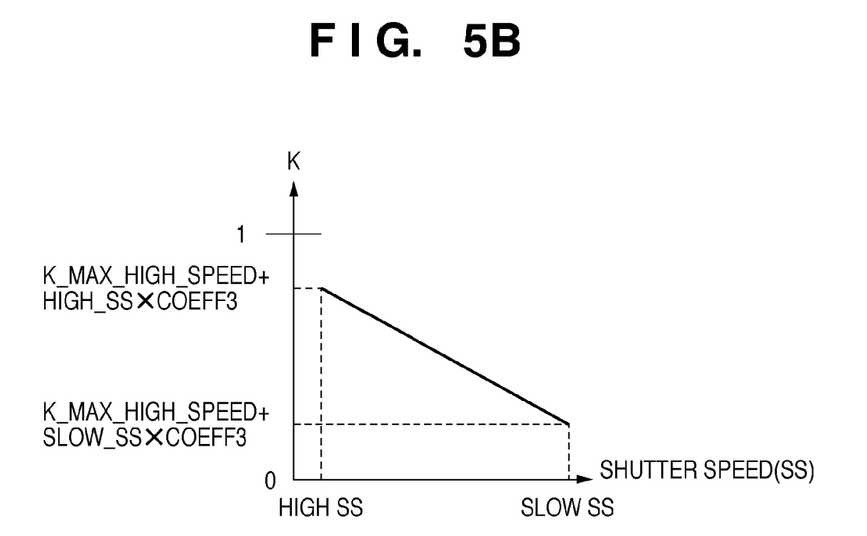
FIG. 5B is a graph illustrating a change of the value of a coefficient K in the third embodiment.

FIG. 5B is a graph exemplifying a change of the value of the coefficient K corresponding to the value of the shutter speed SS in step S30. The value of the coefficient K becomes a maximum value K_MAX_HIGH_SPEED+HIGH_SS×COEFF3 at the highest shutter speed HIGH_SS. The value of the coefficient K decreases for a slower shutter speed SS, and becomes a minimum value K_MAX_HIGH_SPEED+SLOW_SS×COEFF3 at the slowest shutter speed SLOW_SS. In the third embodiment, the slowest shutter speed SLOW_SS can be set to 1/60 sec which is the processing cycle of the vector coefficient controller 130. This setting of the value of the coefficient K has the following advantages.

The vibration amount during the accumulation period of time increases for a slower shutter speed. Hence, in the third embodiment, the coefficient K is decreased for a slower shutter speed SS of the image capturing apparatus, reducing the ratio of electronic vibration correction. With this setting, vibrations during the accumulation period of time cannot be identified by the human eye even at a slow shutter speed.

As described above, the third embodiment can provide an image capturing apparatus whichs improves the vibration correction ability using both electronic and optical vibration correction systems while minimizing vibrations during the accumulation period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2009-296383, filed on Dec. 25, 2009, which is hereby incorporated by reference herein in its entirety.

What is claimed is:

1. An image capturing apparatus comprising:
   an image sensing unit arranged to sense an object image formed by an optical system;
   an vibration detection unit arranged to detect a vibration applied to the image capturing apparatus;
   a vector detection unit arranged to detect a motion vector from an image sensed by said image sensing unit;
   a first calculation unit arranged to calculate a first correction amount from a signal obtained based on an output from said vibration detection unit and a signal obtained by multiplying the motion vector by a predetermined coefficient 1−K (0≦K≦1);
   a second calculation unit arranged to calculate a second correction amount based on a signal obtained by multiplying the motion vector by a predetermined coefficient K, where 0≦K≦1;
   a first correction unit arranged to optically correct the vibration based on the first correction amount; and
   a second correction unit arranged to electronically correct the vibration by changing an image read region based on the second correction amount,
   wherein the image capturing apparatus is arranged such that vibration correction is performed using both said first correction unit and said second correction unit.

2. The apparatus according to claim 1, wherein the coefficient K is increased for a wider image readable region within which the image read region is changed by said second correction unit.

3. The apparatus according to claim 2, wherein the coefficient K is set to a preset value when the image readable region within which the image read region is changed by said second correction unit exceeds a preset region.

4. The apparatus according to claim 1, wherein the coefficient K is decreased for a longer focal length of the image capturing apparatus.

5. The apparatus according to claim 1, the coefficient K is decreased for a lower shutter speed.

6. A method of controlling an image capturing apparatus including an image sensing unit arranged to sense an object image formed by an optical system, the method comprising:

detecting a vibration applied to the image capturing apparatus;

detecting a motion vector from an image sensed by the image sensing unit; calculating a first correction amount from a signal obtained based on an output in the detecting a vibration, and a signal obtained by multiplying the motion vector by a predetermined coefficient 1−K ($0 \leq K \leq 1$);

calculating a second correction amount based on a signal obtained by multiplying the motion vector by a predetermined coefficient K, where $0 \leq K \leq 1$;

optically correcting the vibration based on the first correction amount; and correcting the vibration by changing an image read region based on the second correction amount, wherein vibration correction is performed using both the optically correcting the vibration and the correcting the vibration.

* * * * *